(12) United States Patent
John Wilson et al.

(10) Patent No.: US 11,076,400 B2
(45) Date of Patent: *Jul. 27, 2021

(54) MULTI-LINK NEW RADIO PHYSICAL UPLINK CONTROL CHANNEL BEAM SELECTION AND REPORTING BASED AT LEAST IN PART ON PHYSICAL DOWNLINK CONTROL CHANNEL OR PHYSICAL DOWNLINK SHARED CHANNEL REFERENCE SIGNALS

(71) Applicant: QUALCOMM Incorporated, San Diego, CA (US)

(72) Inventors: Makesh Pravin John Wilson, San Diego, CA (US); Tao Luo, San Diego, CA (US); Sony Akkarakaran, Poway, CA (US); Sumeeth Nagaraja, Los Altos, CA (US); Xiao feng Wang, San Diego, CA (US); Kaushik Chakraborty, San Diego, CA (US); Wooseok Nam, San Diego, CA (US); Shengbo Chen, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/713,456

(22) Filed: Dec. 13, 2019

(65) Prior Publication Data
US 2020/0120654 A1 Apr. 16, 2020

Related U.S. Application Data

(63) Continuation of application No. 15/729,331, filed on Oct. 10, 2017, now Pat. No. 10,512,075.
(Continued)

(51) Int. Cl.
*H04W 72/04* (2009.01)
*H04B 7/0413* (2017.01)
(Continued)

(52) U.S. Cl.
CPC ........ *H04W 72/044* (2013.01); *H04B 7/0408* (2013.01); *H04B 7/0413* (2013.01);
(Continued)

(58) Field of Classification Search
CPC .......... H04W 72/044; H04W 72/0406; H04W 72/14; H04W 88/02; H04W 88/08;
(Continued)

(56) References Cited

U.S. PATENT DOCUMENTS 6,438,389 B1 8/2002 Sandhu et al.
7,602,760 B2 10/2009 Zeira
(Continued)

FOREIGN PATENT DOCUMENTS

CN 104620551 A 5/2015
EP 2993804 A1 3/2016
(Continued)

OTHER PUBLICATIONS

International Search Report and Written Opinion—PCT/US2017/069042—ISA/EPO—dated Mar. 22, 2018.
(Continued)

*Primary Examiner* — Candal Elpenord
(74) *Attorney, Agent, or Firm* — Linda G. Gunderson; Harrity & Harrity LLP

(57) ABSTRACT

A method, an apparatus, and a computer program product for wireless communication are provided. The apparatus may receive a downlink transmission from at least one beam of a set of beams. The set of beams may be associated with a multi-beam communication between the apparatus and a base station. The apparatus may select a beam, of the set of
(Continued)

beams, to report beam related information associated with the at least one beam of the set of beams. The apparatus may report an indication that the beam is a selected beam.

20 Claims, 12 Drawing Sheets

Related U.S. Application Data

(60) Provisional application No. 62/453,863, filed on Feb. 2, 2017.

(51) Int. Cl.
| | | |
|---|---|---|
| *H04B 7/06* | (2006.01) | |
| *H04W 72/14* | (2009.01) | |
| *H04B 7/0408* | (2017.01) | |
| *H04B 7/08* | (2006.01) | |
| *H04W 88/02* | (2009.01) | |
| *H04L 5/00* | (2006.01) | |
| *H04W 88/08* | (2009.01) | |
| *H04B 7/0417* | (2017.01) | |

(52) U.S. Cl.
CPC ......... *H04B 7/0617* (2013.01); *H04B 7/0695* (2013.01); *H04B 7/088* (2013.01); *H04W 72/0406* (2013.01); *H04W 72/14* (2013.01); *H04B 7/0417* (2013.01); *H04L 5/0048* (2013.01); *H04W 88/02* (2013.01); *H04W 88/08* (2013.01)

(58) Field of Classification Search
CPC .. H04B 7/0408; H04B 7/0413; H04B 7/0617; H04B 7/0695; H04B 7/088; H04B 7/0417; H04L 5/0048
See application file for complete search history.

(56) References Cited

U.S. PATENT DOCUMENTS

| | | | |
|---|---|---|---|
| 9,237,475 B2 | 1/2016 | Josiam et al. | |
| 9,825,682 B2 | 11/2017 | Park et al. | |
| 9,825,747 B2 | 11/2017 | Chen et al. | |
| 10,512,075 B2 | 12/2019 | John Wilson et al. | |
| 2005/0215261 A1 | 9/2005 | Cha et al. | |
| 2007/0093271 A1 | 4/2007 | Hovers et al. | |
| 2007/0135139 A1* | 6/2007 | Avidor | H04W 72/1252 |
| | | | 455/456.5 |
| 2010/0127931 A1* | 5/2010 | Rensburg | H04B 7/0604 |
| | | | 342/372 |
| 2010/0267341 A1 | 10/2010 | Bergel et al. | |
| 2011/0103247 A1 | 5/2011 | Chen et al. | |
| 2011/0274043 A1 | 11/2011 | Nam et al. | |
| 2013/0163544 A1* | 6/2013 | Lee | H04L 5/0048 |
| | | | 370/329 |
| 2014/0044210 A1 | 2/2014 | Baker et al. | |
| 2015/0003325 A1* | 1/2015 | Sajadieh | H04W 56/0005 |
| | | | 370/328 |
| 2016/0197659 A1 | 7/2016 | Yu et al. | |
| 2016/0330010 A1 | 11/2016 | Qin et al. | |
| 2017/0141825 A1 | 5/2017 | Zhang et al. | |
| 2017/0295508 A1 | 10/2017 | Stirling-Gallacher et al. | |
| 2018/0049055 A1* | 2/2018 | Wiberg | H04W 72/044 |
| 2018/0124819 A1* | 5/2018 | Kwon | H04W 72/046 |
| 2019/0215039 A1 | 7/2019 | Gao et al. | |

FOREIGN PATENT DOCUMENTS

| | | |
|---|---|---|
| WO | WO-2011053970 | 5/2011 |
| WO | WO-2014116413 | 7/2014 |
| WO | 2016015213 A1 | 2/2016 |
| WO | 2017095467 A1 | 6/2017 |

OTHER PUBLICATIONS

SONY: "Cell Quality Measurement Evaluation Using Multiple Beams", R2-168557, 3GPP TSG RAN WG2 Meeting #96, Reno, USA, Nov. 14-18, 2016, 4 Pages.

Taiwan Search Report—TW107100301—TIPO—dated May 11, 2021.

* cited by examiner

MULTI-LINK NEW RADIO PHYSICAL UPLINK CONTROL CHANNEL BEAM SELECTION AND REPORTING BASED AT LEAST IN PART ON PHYSICAL DOWNLINK CONTROL CHANNEL OR PHYSICAL DOWNLINK SHARED CHANNEL REFERENCE SIGNALS

CROSS REFERENCE TO RELATED APPLICATION UNDER 35 U.S.C. § 119

This application is a continuation of U.S. patent application Ser. No. 15/729,331 filed on Oct. 10, 2017 (now U.S. Pat. No. 10,512,075), entitled "MULTI-LINK NEW RADIO PHYSICAL UPLINK CONTROL CHANNEL BEAM SELECTION AND REPORTING BASED AT LEAST IN PART ON PHYSICAL DOWNLINK CONTROL CHANNEL OR PHYSICAL DOWNLINK SHARED CHANNEL REFERENCE SIGNALS," which claims priority to U.S. Provisional Patent Application No. 62/453,863 filed on Feb. 2, 2017 entitled "MULTI-LINK NEW RADIO PHYSICAL UPLINK CONTROL CHANNEL BEAM SELECTION AND REPORTING BASED AT LEAST IN PART ON PHYSICAL DOWNLINK CONTROL CHANNEL OR PHYSICAL DOWNLINK SHARED CHANNEL REFERENCE SIGNALS," which are incorporated by reference herein.

BACKGROUND

Field

Aspects of the present disclosure generally relate to wireless communication, and more particularly to techniques and apparatuses for multi-link new radio (NR) physical uplink control channel (PUCCH) beam selection and reporting based at least in part on physical downlink control channel (PDCCH) or physical downlink shared channel (PDSCH) reference signals.

Background

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, and/or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless communication network may include a number of base stations (BSs) that can support communication for a number of user equipment (UEs). A UE may communicate with a BS via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a new radio (NR) BS, a 5G Node B, and/or the like.

The above multiple access technologies have been adopted in various telecommunication standards to provide a common protocol that enables different wireless communication devices to communicate on a municipal, national, regional, and even global level. New radio (NR), which may also be referred to as 5G, is a set of enhancements to the LTE mobile standard promulgated by the Third Generation Partnership Project (3GPP). NR is designed to better support mobile broadband Internet access by improving spectral efficiency, lowering costs, improving services, making use of new spectrum, and better integrating with other open standards using OFDM with a cyclic prefix (CP) (CP-OFDM) on the downlink (DL), using CP-OFDM and/or SC-FDM (e.g., also known as discrete Fourier transform spread ODFM (DFT-s-OFDM)) on the uplink (UL), as well as supporting beamforming, multiple-input multiple-output (MIMO) antenna technology, and carrier aggregation. However, as the demand for mobile broadband access continues to increase, there exists a need for further improvements in LTE and NR technologies. Preferably, these improvements should be applicable to other multiple access technologies and the telecommunication standards that employ these technologies.

SUMMARY

In an aspect of the disclosure, a method, an apparatus, and a computer program product are provided.

In some aspects, the method may include receiving, by a user equipment (UE), a downlink transmission from at least one beam of a set of beams, where the set of beams may be associated with a multi-beam communication between the UE and a base station; selecting, by the UE, a beam, of the set of beams, to report beam related information associated with the at least one beam of the set of beams; and reporting, by the UE, an indication that the beam is a selected beam.

In some aspects, the apparatus may include a memory and at least one processor coupled to the memory. The at least one processor may be configured to receive a downlink transmission from at least one beam of a set of beams, where the set of beams may be associated with a multi-beam communication between a UE and a base station; select a beam, of the set of beams, to report beam related information associated with the at least one beam of the set of beams; and report an indication that the beam is a selected beam.

In some aspects, the apparatus may include means for receiving a downlink transmission from at least one beam of a set of beams, where the set of beams may be associated with a multi-beam communication between a UE and a base station; means for selecting a beam, of the set of beams, to report beam related information associated with the at least one beam of the set of beams; and means for reporting an indication that the beam is a selected beam.

In some aspects, the computer program product may include a non-transitory computer-readable medium storing computer executable code. The code may include code for receiving a downlink transmission from at least one beam of a set of beams, where the set of beams may be associated with a multi-beam communication between a UE and a base station; selecting a beam, of the set of beams, to report beam related information associated with the at least one beam of the set of beams; and reporting an indication that the beam is a selected beam.

In some aspects, the method may include transmitting, by a base station, downlink data to a UE using a set of beams associated with a multi-beam communication between the base station and the UE; receiving, by the base station, uplink data including an indication that at least one beam, of the set of beams, is a selected beam to communicate beam related information; and identifying, by the base station, the at least one beam as the selected beam based at least in part on the uplink data.

In some aspects, the apparatus may include a memory and at least one processor coupled to the memory. The at least one processor may be configured to transmit downlink data to a UE using a set of beams associated with a multi-beam communication between the apparatus and the UE; receive uplink data including an indication that at least one beam, of the set of beams, is a selected beam to communicate beam related information; and identify the at least one beam as the selected beam based at least in part on the uplink data.

In some aspects, the apparatus may include means for transmitting downlink data to a UE using a set of beams associated with a multi-beam communication between the apparatus and the UE; means for receiving uplink data including an indication that at least one beam, of the set of beams, is a selected beam to communicate beam related information; and means for identifying the at least one beam as the selected beam based at least in part on the uplink data.

In some aspects, the computer program product may include a non-transitory computer-readable medium storing computer executable code. The code may include code for transmitting downlink data to a UE using a set of beams associated with a multi-beam communication between a base station and the UE; receiving uplink data including an indication that at least one beam, of the set of beams, is a selected beam to communicate beam related information; and identifying the at least one beam as the selected beam based at least in part on the uplink data.

Aspects generally include a method, apparatus, system, computer program product, non-transitory computer-readable medium, user equipment, wireless communication device, and processing system as substantially described herein with reference to and as illustrated by the accompanying drawings.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purpose of illustration and description, and not as a definition of the limits of the claims.

DETAILED DESCRIPTION

Figure 1:
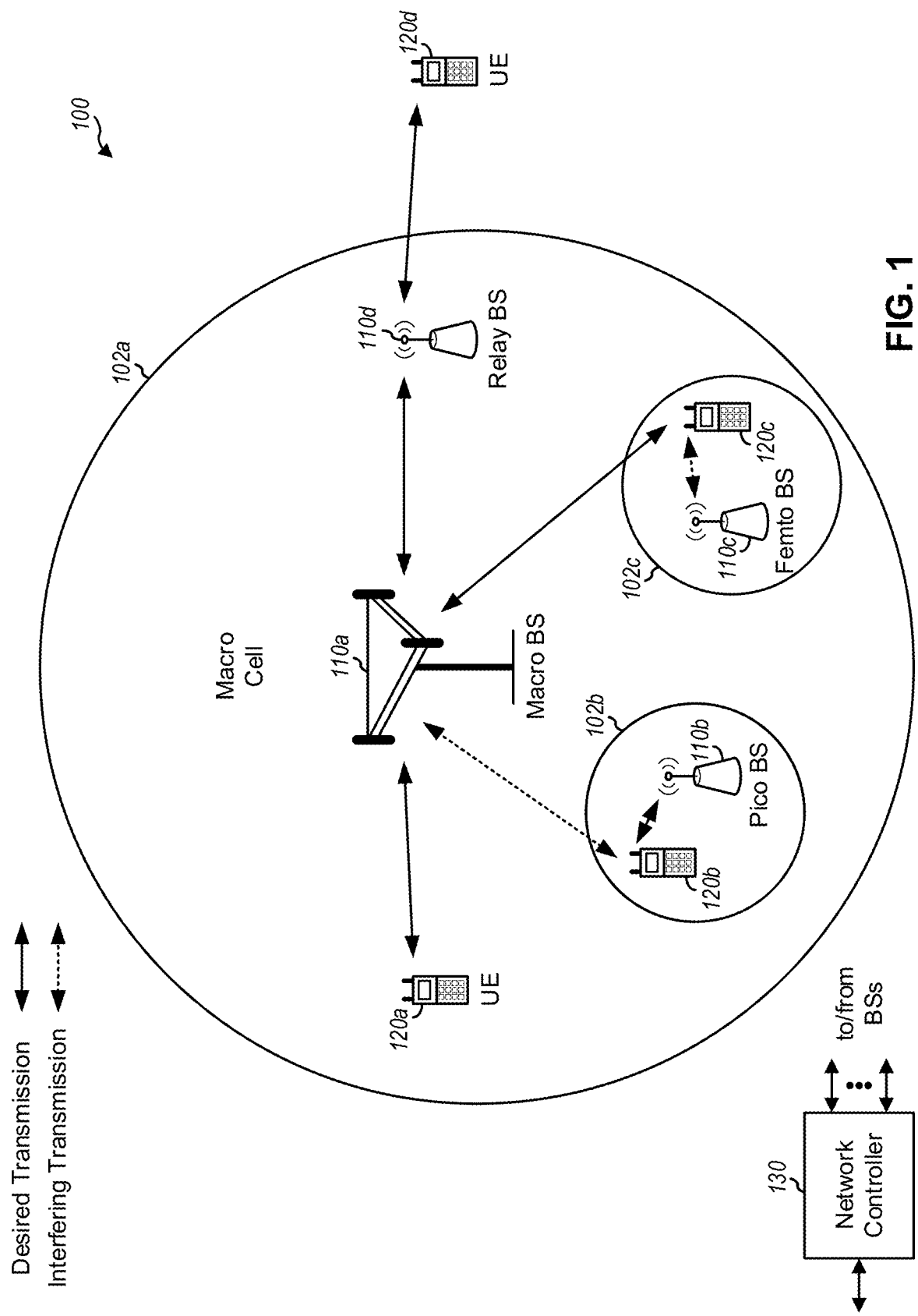
FIG. 1 is diagram illustrating an example of a wireless communication network.

The detailed description set forth below in connection with the appended drawings is intended as a description of various configurations and is not intended to represent the configurations in which the concepts described herein may be practiced. The detailed description includes specific details for the purposes of providing a thorough understanding of various concepts. However, it will be apparent to those skilled in the art that these concepts may be practiced without these specific details. In some instances, well-known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, modules, components, circuits, steps, processes, algorithms, and/or the like (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, and/or the like, whether referred to as software, firmware, middleware, microcode, hardware description language, or otherwise.

Accordingly, in one or more example embodiments, the functions described may be implemented in hardware, software, firmware, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), compact disk ROM (CD-ROM) or other optical disk storage, magnetic disk storage or other magnetic storage devices, combinations of the aforementioned types of computer-readable media, or any other medium that can be used to store computer executable code in the form of instructions or data structures that can be accessed by a computer.

An access point ("AP") may comprise, be implemented as, or known as a NodeB, a Radio Network Controller ("RNC"), an eNodeB (eNB), a Base Station Controller ("BSC"), a Base Transceiver Station ("BTS"), a Base Station ("BS"), a Transceiver Function ("TF"), a Radio Router, a Radio Transceiver, a Basic Service Set ("BSS"), an Extended Service Set ("ESS"), a Radio Base Station ("RBS"), a Node B (NB), a gNB, a 5G NB, a NR BS, a Transmit Receive Point (TRP), or some other terminology.

An access terminal ("AT") may comprise, be implemented as, or be known as an access terminal, a subscriber station, a subscriber unit, a mobile station, a remote station, a remote terminal, a user terminal, a user agent, a user device, user equipment (UE), a user station, a wireless node, or some other terminology. In some aspects, an access terminal may comprise a cellular telephone, a smart phone, a cordless telephone, a Session Initiation Protocol ("SIP") phone, a wireless local loop ("WLL") station, a personal digital assistant ("PDA"), a tablet, a netbook, a smartbook, an ultrabook, a handheld device having wireless connection capability, a Station ("STA"), or some other suitable processing device connected to a wireless modem. Accordingly, one or more aspects taught herein may be incorporated into a phone (e.g., a cellular phone, a smart phone), a computer (e.g., a desktop), a portable communication device, a portable computing device (e.g., a laptop, a personal data assistant, a tablet, a netbook, a smartbook, an ultrabook), wearable device (e.g., smart watch, smart glasses, smart bracelet, smart wristband, smart ring, smart clothing, and/or the like), medical devices or equipment, biometric sensors/devices, an entertainment device (e.g., music device, video device, satellite radio, gaming device, and/or the like), a vehicular component or sensor, smart meters/sensors, industrial manufacturing equipment, a global positioning system device, or any other suitable device that is configured to communicate via a wireless or wired medium. In some aspects, the node is a wireless node. A wireless node may provide, for example, connectivity for or to a network (e.g., a wide area network such as the Internet or a cellular network) via a wired or wireless communication link. Some UEs may be considered machine-type communication (MTC) UEs, which may include remote devices that may communicate with a base station, another remote device, or some other entity. Machine type communications (MTC) may refer to communication involving at least one remote device on at least one end of the communication and may include forms of data communication which involve one or more entities that do not necessarily need human interaction. MTC UEs may include UEs that are capable of MTC communications with MTC servers and/or other MTC devices through Public Land Mobile Networks (PLMN), for example. Examples of MTC devices include sensors, meters, location tags, monitors, drones, robots/robotic devices, and/or the like. MTC UEs, as well as other types of UEs, may be implemented as NB-IoT (narrowband internet of things) devices.

It is noted that while aspects may be described herein using terminology commonly associated with 3G and/or 4G wireless technologies, aspects of the present disclosure can be applied in other generation-based communication systems, such as 5G and later, including NR technologies.

FIG. 1 is a diagram illustrating a network 100 in which aspects of the present disclosure may be practiced. The network 100 may be an LTE network or some other wireless network, such as a 5G or NR network. Wireless network 100 may include a number of BSs 110 (shown as BS 110a, BS 110b, BS 110c, and BS 110d) and other network entities. A BS is an entity that communicates with user equipment (UEs) and may also be referred to as a base station, a NR BS, a Node B, a gNB, a 5G NB, an access point, a TRP, and/or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some examples, a cell may not necessarily be stationary, and the geographic area of the cell may move according to the location of a mobile BS. In some examples, the BSs may be interconnected to one another and/or to one or more other BSs or network nodes (not shown) in the access network 100 through various types of backhaul interfaces such as a direct physical connection, a virtual network, and/or the like using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay station 110d may communicate with macro BS 110a and a UE 120d in order to facilitate communication between BS 110*a* and UE 120*d*. A relay station may also be referred to as a relay BS, a relay base station, a relay, and/or the like.

Wireless network 100 may be a heterogeneous network that includes BSs of different types, e.g., macro BSs, pico BSs, femto BSs, relay BSs, and/or the like. These different types of BSs may have different transmit power levels, different coverage areas, and different impact on interference in wireless network 100. For example, macro BSs may have a high transmit power level (e.g., 5 to 40 Watts) whereas pico BSs, femto BSs, and relay BSs may have lower transmit power levels (e.g., 0.1 to 2 Watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120*a*, 120*b*, 120*c*) may be dispersed throughout wireless network 100, and each UE may be stationary or mobile. A UE may also be referred to as an access terminal, a terminal, a mobile station, a subscriber unit, a station, and/or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium. Some UEs may be considered evolved or enhanced machine-type communication (eMTC) UEs. MTC and eMTC UEs include, for example, robots, drones, remote devices, such as sensors, meters, monitors, location tags, and/or the like, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices. Some UEs may be considered a Customer Premises Equipment (CPE).

In FIG. 1, a solid line with double arrows indicates desired transmissions between a UE and a serving BS, which is a BS designated to serve the UE on the downlink and/or uplink. A dashed line with double arrows indicates potentially interfering transmissions between a UE and a BS.

In general, any number of wireless networks may be deployed in a given geographic area. Each wireless network may support a particular RAT and may operate on one or more frequencies. A RAT may also be referred to as a radio technology, an air interface, and/or the like. A frequency may also be referred to as a carrier, a frequency channel, and/or the like. Each frequency may support a single RAT in a given geographic area in order to avoid interference between wireless networks of different RATs. In some cases, NR or 5G RAT networks may be deployed.

In some examples, access to the air interface may be scheduled, wherein a scheduling entity (e.g., a base station) allocates resources for communication among some or all devices and equipment within the scheduling entity's service area or cell. Within the present disclosure, as discussed further below, the scheduling entity may be responsible for scheduling, assigning, reconfiguring, and releasing resources for one or more subordinate entities. That is, for scheduled communication, subordinate entities utilize resources allocated by the scheduling entity.

Base stations are not the only entities that may function as a scheduling entity. That is, in some examples, a UE may function as a scheduling entity, scheduling resources for one or more subordinate entities (e.g., one or more other UEs). In this example, the UE is functioning as a scheduling entity, and other UEs utilize resources scheduled by the UE for wireless communication. A UE may function as a scheduling entity in a peer-to-peer (P2P) network, and/or in a mesh network. In a mesh network example, UEs may optionally communicate directly with one another in addition to communicating with the scheduling entity.

Thus, in a wireless communication network with a scheduled access to time-frequency resources and having a cellular configuration, a P2P configuration, and a mesh configuration, a scheduling entity and one or more subordinate entities may communicate utilizing the scheduled resources.

As indicated above, FIG. 1 is provided merely as an example. Other examples are possible and may differ from what was described with regard to FIG. 1.

Figure 2:
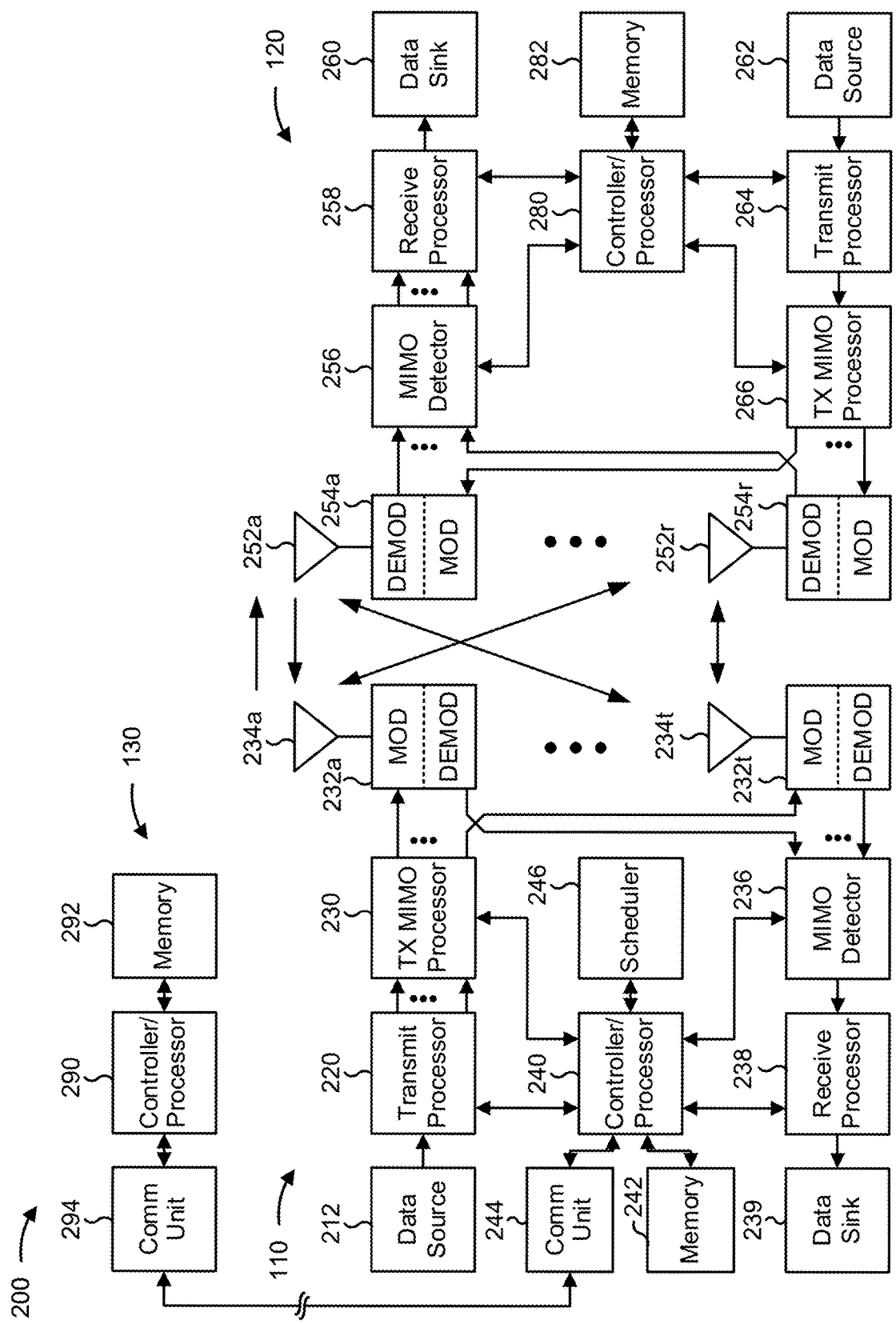
FIG. 2 is a diagram illustrating an example of a base station in communication with a user equipment (UE) in a wireless communication network.

FIG. 2 shows a block diagram 200 of a design of base station 110 and UE 120, which may be one of the base stations and one of the UEs in FIG. 1. Base station 110 may be equipped with T antennas 234*a* through 234*t*, and UE 120 may be equipped with R antennas 252*a* through 252*r*, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI), and/or the like) and control information (e.g., CQI requests, grants, upper layer signaling, and/or the like) and provide overhead symbols and control symbols. Transmit processor 220 may also generate reference symbols for reference signals (e.g., the CRS) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232*a* through 232*t*. Each modulator 232 may process a respective output symbol stream (e.g., for OFDM and/or the like) to obtain an output sample stream. Each modulator 232 may further process (e.g., convert to analog, amplify, filter, and upconvert) the output sample stream to obtain a downlink signal. T downlink signals from modulators 232*a* through 232*t* may be transmitted via T antennas 234*a* through 234*t*, respectively. According to certain aspects described in more detail below, the synchronization signals can be generated with location encoding to convey additional information.

At UE 120, antennas 252*a* through 252*r* may receive the downlink signals from base station 110 and/or other base stations and may provide received signals to demodulators (DEMODs) 254*a* through 254*r*, respectively. Each demodulator 254 may condition (e.g., filter, amplify, downconvert, and digitize) a received signal to obtain input samples. Each demodulator 254 may further process the input samples (e.g., for OFDM and/or the like) to obtain received symbols. A MIMO detector 256 may obtain received symbols from all R demodulators 254a through 254r, perform MIMO detection on the received symbols if applicable, and provide detected symbols. A receive (RX) processor 258 may process (e.g., demodulate and decode) the detected symbols, provide decoded data for UE 120 to a data sink 260, and provide decoded control information and system information to a controller/processor 280. A channel processor may determine RSRP, RSSI, RSRQ, CQI, and/or the like.

On the uplink, at UE 120, a transmit processor 264 may receive and process data from a data source 262 and control information (e.g., for reports comprising RSRP, RSSI, RSRQ, CQI, and/or the like) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM, CP-OFDM, and/or the like), and transmitted to base station 110. At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Network controller 130 may include communication unit 294, controller/processor 290, and memory 292.

Controllers/processors 240 and 280 and/or any other component(s) in FIG. 2 may direct the operation at base station 110 and UE 120, respectively, to perform multi-link NR PUCCH beam selection and reporting based at least in part on PDCCH or PDSCH reference signals. For example, controller/processor 280 and/or other processors and modules at base station 110, may perform or direct operations of UE 120 to perform multi-link NR PUCCH beam selection and reporting based at least in part on PDCCH or PDSCH reference signals. For example, controller/processor 280 and/or other controllers/processors and modules at BS 110 may perform or direct operations of, for example, method 1000 of FIG. 10 and/or other processes as described herein. In some aspects, one or more of the components shown in FIG. 2 may be employed to perform example method 1000 of FIG. 10 and/or other processes for the techniques described herein. Memories 242 and 282 may store data and program codes for BS 110 and UE 120, respectively. A scheduler 246 may schedule UEs for data transmission on the downlink and/or uplink.

As indicated above, FIG. 2 is provided merely as an example. Other examples are possible and may differ from what was described with regard to FIG. 2.

Figure 3:
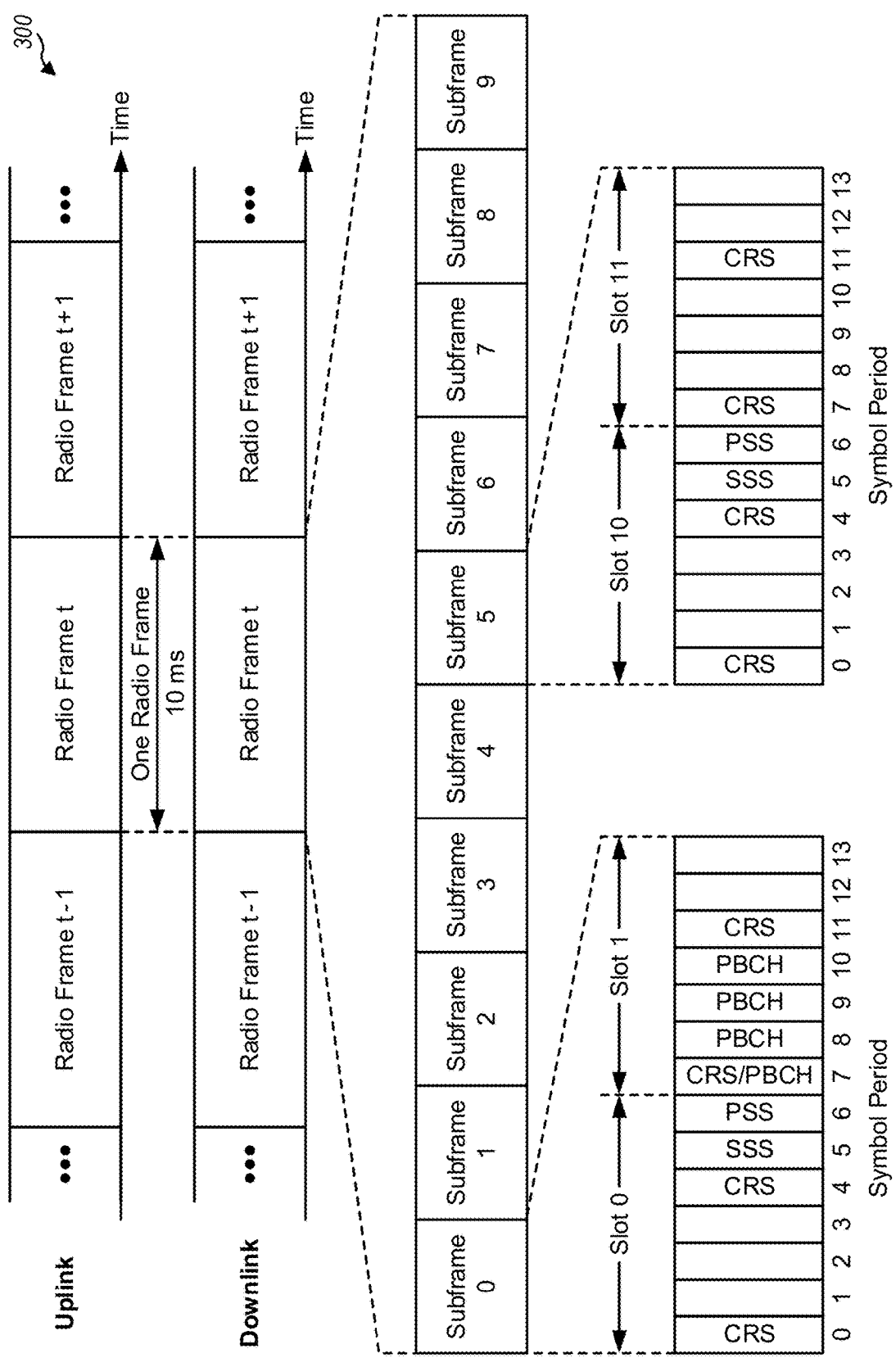
FIG. 3 is a diagram illustrating an example of a frame structure in a wireless communication network.

FIG. 3 shows an example frame structure 300 for FDD in a telecommunications system (e.g., LTE). The transmission timeline for each of the downlink and uplink may be partitioned into units of radio frames. Each radio frame may have a predetermined duration (e.g., 10 milliseconds (ms)) and may be partitioned into 10 subframes with indices of 0 through 9. Each subframe may include two slots. Each radio frame may thus include 20 slots with indices of 0 through 19. Each slot may include L symbol periods, e.g., seven symbol periods for a normal cyclic prefix (as shown in FIG. 3) or six symbol periods for an extended cyclic prefix. The 2L symbol periods in each subframe may be assigned indices of 0 through 2L−1.

While some techniques are described herein in connection with frames, subframes, slots, and/or the like, these techniques may equally apply to other types of wireless communication structures, which may be referred to using terms other than "frame," "subframe," "slot," and/or the like in 5G NR. In some aspects, a wireless communication structure may refer to a periodic time-bounded communication unit defined by a wireless communication standard and/or protocol.

In certain telecommunications (e.g., LTE), a BS may transmit a primary synchronization signal (PSS) and a secondary synchronization signal (SSS) on the downlink in the center of the system bandwidth for each cell supported by the BS. The PSS and SSS may be transmitted in symbol periods 6 and 5, respectively, in subframes 0 and 5 of each radio frame with the normal cyclic prefix, as shown in FIG. 3. The PSS and SSS may be used by UEs for cell search and acquisition. The BS may transmit a cell-specific reference signal (CRS) across the system bandwidth for each cell supported by the BS. The CRS may be transmitted in certain symbol periods of each subframe and may be used by the UEs to perform channel estimation, channel quality measurement, and/or other functions. The BS may also transmit a physical broadcast channel (PBCH) in symbol periods 0 to 3 in slot 1 of certain radio frames. The PBCH may carry some system information. The BS may transmit other system information such as system information blocks (SIBs) on a physical downlink shared channel (PDSCH) in certain subframes. The BS may transmit control information/data on a physical downlink control channel (PDCCH) in the first B symbol periods of a subframe, where B may be configurable for each subframe. The BS may transmit traffic data and/or other data on the PDSCH in the remaining symbol periods of each subframe.

In other systems (e.g., such NR or 5G systems), a Node B may transmit these or other signals in these locations or in different locations of the subframe.

As indicated above, FIG. 3 is provided merely as an example. Other examples are possible and may differ from what was described with regard to FIG. 3.

Figure 4:
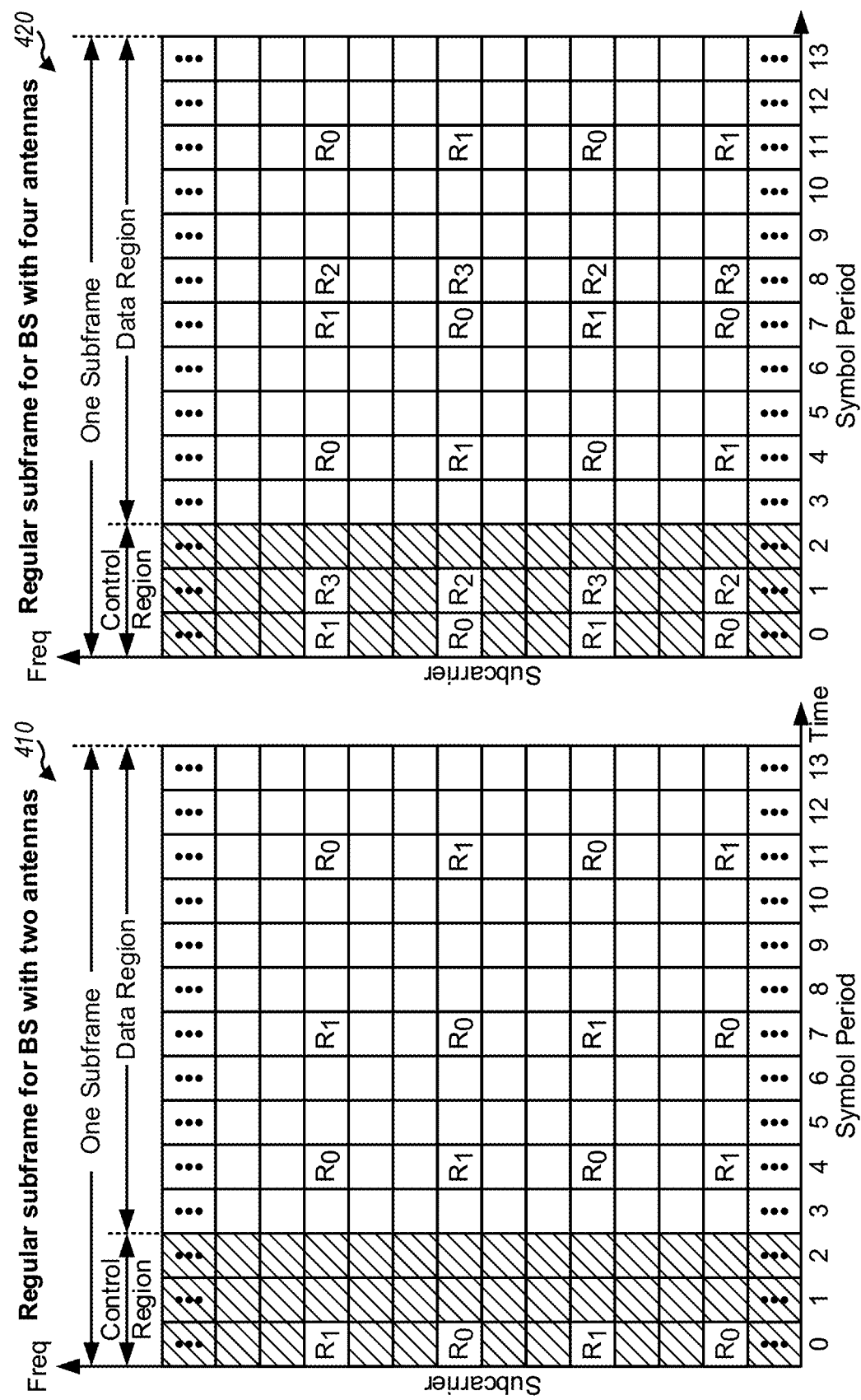
FIG. 4 is a diagram illustrating two example subframe formats with the normal cyclic prefix.

FIG. 4 shows two example subframe formats 410 and 420 with the normal cyclic prefix. The available time frequency resources may be partitioned into resource blocks. Each resource block may cover 12 subcarriers in one slot and may include a number of resource elements. Each resource element may cover one subcarrier in one symbol period and may be used to send one modulation symbol, which may be a real or complex value.

Subframe format 410 may be used for two antennas. A CRS may be transmitted from antennas 0 and 1 in symbol periods 0, 4, 7 and 11. A reference signal is a signal that is known a priori by a transmitter and a receiver and may also be referred to as pilot. A CRS is a reference signal that is specific for a cell, e.g., generated based at least in part on a cell identity (ID). In FIG. 4, for a given resource element with label Ra, a modulation symbol may be transmitted on that resource element from antenna a, and no modulation symbols may be transmitted on that resource element from other antennas. Subframe format 420 may be used with four antennas. A CRS may be transmitted from antennas 0 and 1 in symbol periods 0, 4, 7 and 11 and from antennas 2 and 3 in symbol periods 1 and 8. For both subframe formats 410 and 420, a CRS may be transmitted on evenly spaced subcarriers, which may be determined based at least in part on cell ID. CRSs may be transmitted on the same or different subcarriers, depending on their cell IDs. For both subframe formats 410 and 420, resource elements not used for the CRS may be used to transmit data (e.g., traffic data, control data, and/or other data).

The PSS, SSS, CRS and PBCH in LTE are described in 3GPP TS 36.211, entitled "Evolved Universal Terrestrial Radio Access (E-UTRA); Physical Channels and Modulation," which is publicly available.

An interlace structure may be used for each of the downlink and uplink for FDD in certain telecommunications systems (e.g., LTE). For example, Q interlaces with indices of 0 through Q−1 may be defined, where Q may be equal to 4, 6, 8, 10, or some other value. Each interlace may include subframes that are spaced apart by Q frames. In particular, interlace q may include subframes q, q+Q, q+2Q, and/or the like, where q∈{0, . . . , Q−1}.

The wireless network may support hybrid automatic retransmission request (HARQ) for data transmission on the downlink and uplink. For HARQ, a transmitter (e.g., a BS) may send one or more transmissions of a packet until the packet is decoded correctly by a receiver (e.g., a UE) or some other termination condition is encountered. For synchronous HARQ, all transmissions of the packet may be sent in subframes of a single interlace. For asynchronous HARQ, each transmission of the packet may be sent in any subframe.

A UE may be located within the coverage of multiple BSs. One of these BSs may be selected to serve the UE. The serving BS may be selected based at least in part on various criteria such as received signal strength, received signal quality, path loss, and/or the like. Received signal quality may be quantified by a signal-to-noise-and-interference ratio (SINR), or a reference signal received quality (RSRQ), or some other metric. The UE may operate in a dominant interference scenario in which the UE may observe high interference from one or more interfering BSs.

While aspects of the examples described herein may be associated with LTE technologies, aspects of the present disclosure may be applicable with other wireless communication systems, such as NR or 5G technologies.

New radio (NR) may refer to radios configured to operate according to a new air interface (e.g., other than Orthogonal Frequency Divisional Multiple Access (OFDMA)-based air interfaces) or fixed transport layer (e.g., other than Internet Protocol (IP)). In aspects, NR may utilize OFDM with a CP (herein referred to as cyclic prefix OFDM or CP-OFDM) and/or SC-FDM on the uplink, may utilize CP-OFDM on the downlink and include support for half-duplex operation using TDD. In aspects, NR may, for example, utilize OFDM with a CP (herein referred to as CP-OFDM) and/or discrete Fourier transform spread orthogonal frequency-division multiplexing (DFT-s-OFDM) on the uplink, may utilize CP-OFDM on the downlink and include support for half-duplex operation using TDD. NR may include Enhanced Mobile Broadband (eMBB) service targeting wide bandwidth (e.g., 80 megahertz (MHz) and beyond), millimeter wave (mmW) targeting high carrier frequency (e.g., 60 gigahertz (GHz)), massive MTC (mMTC) targeting non-backward compatible MTC techniques, and/or mission critical targeting ultra reliable low latency communications (URLLC) service.

A single component carrier bandwidth of 100 MHZ may be supported. NR resource blocks may span 12 sub-carriers with a sub-carrier bandwidth of 75 kilohertz (kHz) over a 0.1 ms duration. Each radio frame may include 50 subframes with a length of 10 ms. Consequently, each subframe may have a length of 0.2 ms. Each subframe may indicate a link direction (e.g., DL or UL) for data transmission and the link direction for each subframe may be dynamically switched. Each subframe may include DL/UL data as well as DL/UL control data. UL and DL subframes for NR may be as described in more detail below with respect to FIGS. 7 and 8.

Beamforming may be supported and beam direction may be dynamically configured. MIMO transmissions with precoding may also be supported. MIMO configurations in the DL may support up to 8 transmit antennas with multi-layer DL transmissions up to 8 streams and up to 2 streams per UE. Multi-layer transmissions with up to 2 streams per UE may be supported. Aggregation of multiple cells may be supported with up to 8 serving cells. Alternatively, NR may support a different air interface, other than an OFDM-based interface. NR networks may include entities such central units or distributed units.

The RAN may include a central unit (CU) and distributed units (DUs). A NR BS (e.g., gNB, 5G Node B, Node B, transmit receive point (TRP), access point (AP)) may correspond to one or multiple BSs. NR cells can be configured as access cells (ACells) or data only cells (DCells). For example, the RAN (e.g., a central unit or distributed unit) can configure the cells. DCells may be cells used for carrier aggregation or dual connectivity, but not used for initial access, cell selection/reselection, or handover. In some cases, DCells may not transmit synchronization signals—in some case cases DCells may transmit SS. NR BSs may transmit downlink signals to UEs indicating the cell type. Based at least in part on the cell type indication, the UE may communicate with the NR BS. For example, the UE may determine NR BSs to consider for cell selection, access, handover, and/or measurement based at least in part on the indicated cell type.

As indicated above, FIG. 4 is provided merely as an example. Other examples are possible and may differ from what was described with regard to FIG. 4.

Figure 5:
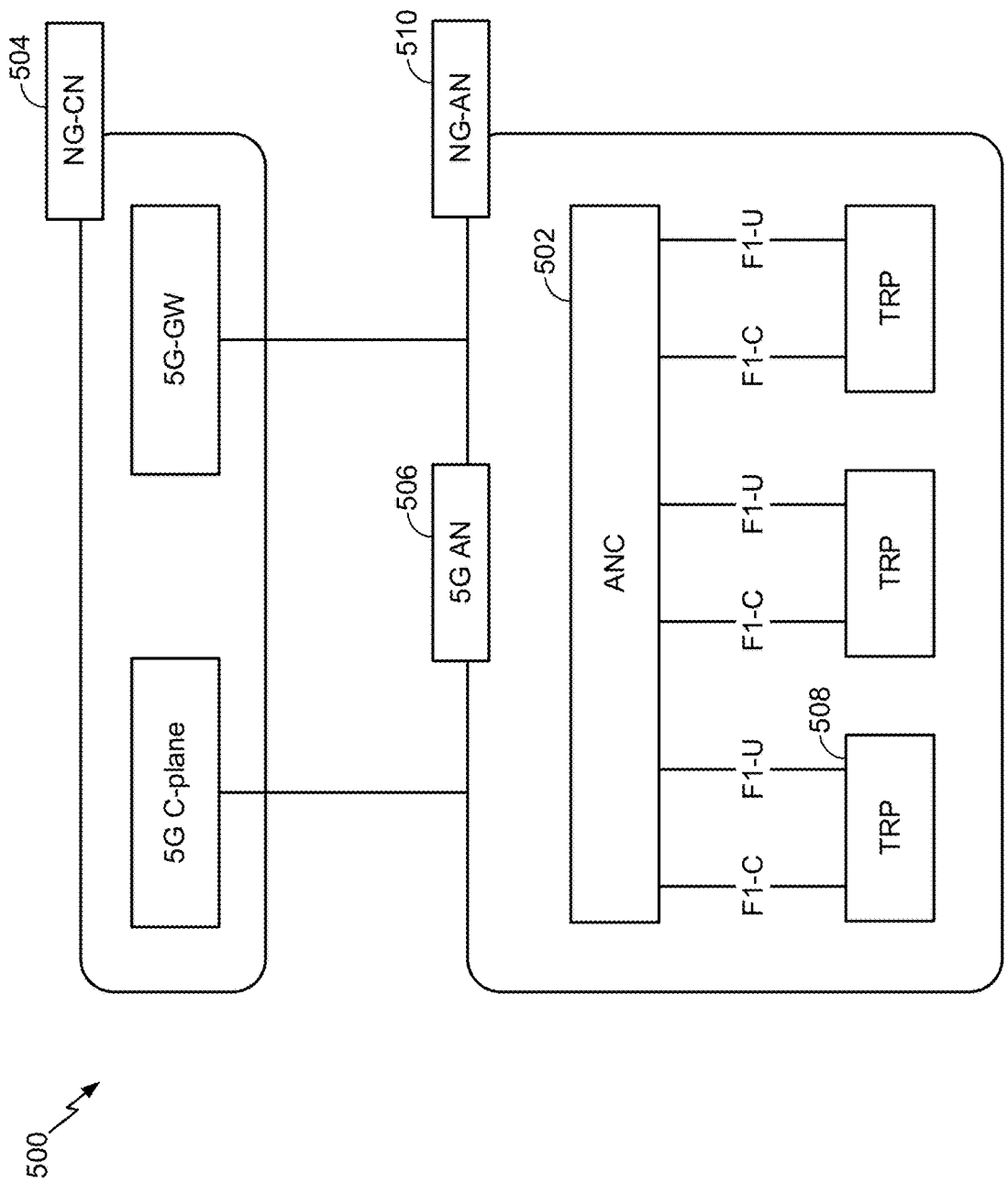
FIG. 5 is a diagram illustrating an example logical architecture of a distributed radio access network (RAN).

FIG. 5 illustrates an example logical architecture of a distributed RAN 500, according to aspects of the present disclosure. A 5G access node 506 may include an access node controller (ANC) 502. The ANC may be a central unit (CU) of the distributed RAN 500. The backhaul interface to the next generation core network (NG-CN) 504 may terminate at the ANC. The backhaul interface to neighboring next generation access nodes (NG-ANs) may terminate at the ANC. The ANC may include one or more TRPs 508 (which may also be referred to as BSs, NR BSs, Node Bs, 5G NBs, APs, gNB, or some other term). As described above, a TRP may be used interchangeably with "cell."

The TRPs 508 may be a distributed unit (DU). The TRPs may be connected to one ANC (ANC 502) or more than one ANC (not illustrated). For example, for RAN sharing, radio as a service (RaaS), and service specific AND deployments, the TRP may be connected to more than one ANC. A TRP may include one or more antenna ports. The TRPs may be configured to individually (e.g., dynamic selection) or jointly (e.g., joint transmission) serve traffic to a UE.

The local architecture of RAN 500 may be used to illustrate fronthaul definition. The architecture may be defined that support fronthauling solutions across different deployment types. For example, the architecture may be based at least in part on transmit network capabilities (e.g., bandwidth, latency, and/or jitter).

The architecture may share features and/or components with LTE. According to aspects, the next generation AN (NG-AN) 510 may support dual connectivity with NR. The NG-AN may share a common fronthaul for LTE and NR.

The architecture may enable cooperation between and among TRPs 508. For example, cooperation may be preset within a TRP and/or across TRPs via the ANC 502. According to aspects, no inter-TRP interface may be needed/present.

According to aspects, a dynamic configuration of split logical functions may be present within the architecture of RAN 500. The PDCP, RLC, MAC protocol may be adaptably placed at the ANC or TRP.

According to certain aspects, a BS may include a central unit (CU) (e.g., ANC 502) and/or one or more distributed units (e.g., one or more TRPs 508).

As indicated above, FIG. 5 is provided merely as an example. Other examples are possible and may differ from what was described with regard to FIG. 5.

Figure 6:
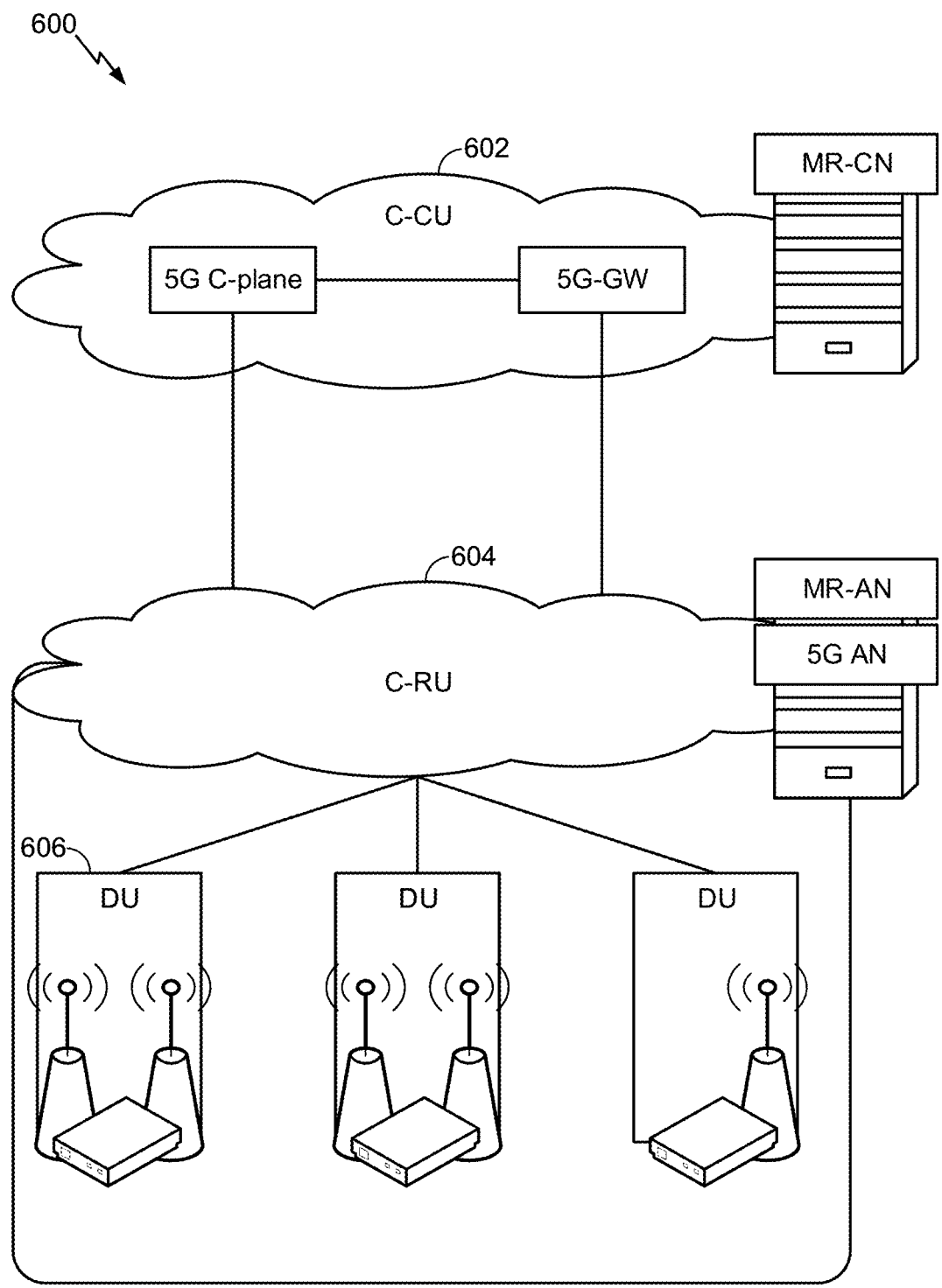
FIG. 6 is a diagram illustrating an example physical architecture of a distributed RAN.

FIG. 6 illustrates an example physical architecture of a distributed RAN 600, according to aspects of the present disclosure. A centralized core network unit (C-CU) 602 may host core network functions. The C-CU may be centrally deployed. C-CU functionality may be offloaded (e.g., to advanced wireless services (AWS)), in an effort to handle peak capacity.

A centralized RAN unit (C-RU) 604 may host one or more ANC functions. Optionally, the C-RU may host core network functions locally. The C-RU may have distributed deployment. The C-RU may be closer to the network edge.

A distributed unit (DU) 606 may host one or more TRPs. The DU may be located at edges of the network with radio frequency (RF) functionality.

As indicated above, FIG. 6 is provided merely as an example. Other examples are possible and may differ from what was described with regard to FIG. 6.

Figure 7:
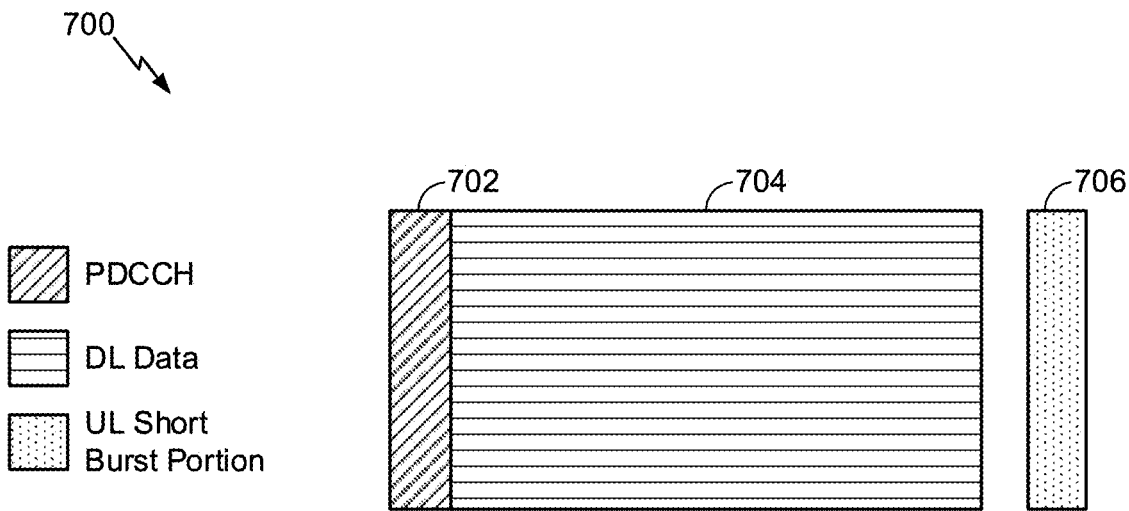
FIG. 7 is a diagram illustrating an example of a downlink (DL)-centric wireless communication structure.

FIG. 7 is a diagram 700 showing an example of a DL-centric subframe or wireless communication structure. The DL-centric subframe may include a control portion 702. The control portion 702 may exist in the initial or beginning portion of the DL-centric subframe. The control portion 702 may include various scheduling information and/or control information corresponding to various portions of the DL-centric subframe. In some configurations, the control portion 702 may be a physical DL control channel (PDCCH), as indicated in FIG. 7.

The DL-centric subframe may also include a DL data portion 704. The DL data portion 704 may sometimes be referred to as the payload of the DL-centric subframe. The DL data portion 704 may include the communication resources utilized to communicate DL data from the scheduling entity (e.g., UE or BS) to the subordinate entity (e.g., UE). In some configurations, the DL data portion 704 may be a physical DL shared channel (PDSCH).

The DL-centric subframe may also include an UL short burst portion 706. The UL short burst portion 706 may sometimes be referred to as an UL burst, an UL burst portion, a common UL burst, a short burst, an UL short burst, a common UL short burst, a common UL short burst portion, and/or various other suitable terms. In some aspects, the UL short burst portion 706 may include one or more reference signals. Additionally, or alternatively, the UL short burst portion 706 may include feedback information corresponding to various other portions of the DL-centric subframe. For example, the UL short burst portion 706 may include feedback information corresponding to the control portion 702 and/or the data portion 704. Non-limiting examples of information that may be included in the UL short burst portion 706 include an ACK signal (e.g., a PUCCH ACK, a PUSCH ACK, an immediate ACK), a NACK signal (e.g., a PUCCH NACK, a PUSCH NACK, an immediate NACK), a scheduling request (SR), a buffer status report (BSR), a HARQ indicator, a channel state indication (CSI), a channel quality indicator (CQI), a sounding reference signal (SRS), a demodulation reference signal (DMRS), PUSCH data, and/or various other suitable types of information. The UL short burst portion 706 may include additional or alternative information, such as information pertaining to random access channel (RACH) procedures, scheduling requests, and various other suitable types of information.

As illustrated in FIG. 7, the end of the DL data portion 704 may be separated in time from the beginning of the UL short burst portion 706. This time separation may sometimes be referred to as a gap, a guard period, a guard interval, and/or various other suitable terms. This separation provides time for the switch-over from DL communication (e.g., reception operation by the subordinate entity (e.g., UE)) to UL communication (e.g., transmission by the subordinate entity (e.g., UE)). The foregoing is merely one example of a DL-centric wireless communication structure, and alternative structures having similar features may exist without necessarily deviating from the aspects described herein.

As indicated above, FIG. 7 is provided merely as an example. Other examples are possible and may differ from what was described with regard to FIG. 7.

Figure 8:
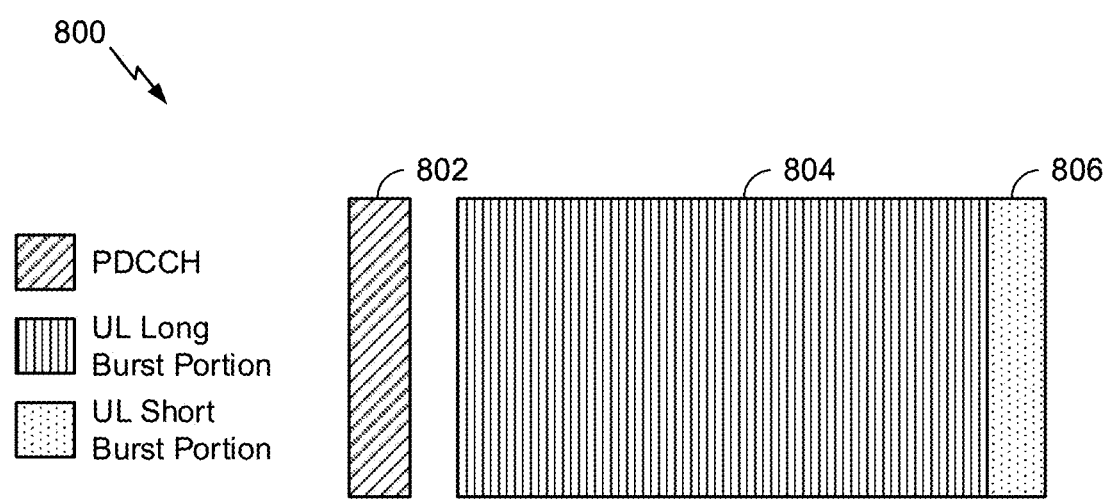
FIG. 8 is a diagram illustrating an example of an uplink (UL)-centric wireless communication structure.

FIG. 8 is a diagram 800 showing an example of an UL-centric subframe or wireless communication structure. The UL-centric subframe may include a control portion 802. The control portion 802 may exist in the initial or beginning portion of the UL-centric subframe. The control portion 802 in FIG. 8 may be similar to the control portion 702 described above with reference to FIG. 7. In some configurations, the control portion 802 may be a physical DL control channel (PDCCH).

The UL-centric subframe may also include an UL long burst portion 804. The UL long burst portion 804 may sometimes be referred to as the payload of the UL-centric subframe. The UL portion may refer to the communication resources utilized to communicate UL data from the subordinate entity (e.g., UE) to the scheduling entity (e.g., UE or BS).

As illustrated in FIG. 8, the end of the control portion 802 may be separated in time from the beginning of the UL long burst portion 804. This time separation may sometimes be referred to as a gap, guard period, guard interval, and/or various other suitable terms. This separation provides time for the switch-over from DL communication (e.g., reception operation by the scheduling entity) to UL communication (e.g., transmission by the scheduling entity).

The UL-centric subframe may also include an UL short burst portion 806. The UL short burst portion 806 in FIG. 8 may be similar to the UL short burst portion 706 described above with reference to FIG. 7, and may include any of the information described above in connection with FIG. 7. The foregoing is merely one example of an UL-centric wireless communication structure and alternative structures having similar features may exist without necessarily deviating from the aspects described herein.

In some circumstances, two or more subordinate entities (e.g., UEs) may communicate with each other using sidelink signals. Real-world applications of such sidelink communications may include public safety, proximity services, UE-to-network relaying, vehicle-to-vehicle (V2V) communications, Internet of Everything (IoE) communications, IoT communications, mission-critical mesh, and/or various other suitable applications. Generally, a sidelink signal may refer to a signal communicated from one subordinate entity (e.g., UE1) to another subordinate entity (e.g., UE2) without relaying that communication through the scheduling entity (e.g., UE or BS), even though the scheduling entity may be utilized for scheduling and/or control purposes. In some examples, the sidelink signals may be communicated using a licensed spectrum (unlike wireless local area networks, which typically use an unlicensed spectrum).

In one example, a wireless communication structure, such as a frame, may include both UL-centric subframes and DL-centric subframes. In this example, the ratio of UL-centric subframes to DL-centric subframes in a frame may be dynamically adjusted based at least in part on the amount of UL data and the amount of DL data that are transmitted. For example, if there is more UL data, then the ratio of UL-centric subframes to DL-centric subframes may be increased. Conversely, if there is more DL data, then the ratio of UL-centric subframes to DL-centric subframes may be decreased.

As indicated above, FIG. 8 is provided merely as an example. Other examples are possible and may differ from what was described with regard to FIG. 8.

A wireless communication standard, such as NR, may allow for multi-link communication between one or more base stations and a UE. In such a case, the one or more base stations may be capable of transmitting different information (e.g., PDCCH data, PDSCH data, and/or the like) to the UE via multiple links. Here, each link may be associated with a different RF beam (hereinafter referred to as a beam and, thus, as multi-beam communication), and the one or more base stations may transmit the different information using the different beams (e.g., first PDCCH data may be transmitted using a first beam, second PDCCH data may be transmitted using a second beam, PDSCH data may be transmitted using a third beam, and/or the like).

However, use of such multi-beam communication impacts operation of the UE in terms of beam measurement (e.g., beam strength) associated with the multiple beams, reporting of beam related information (e.g., including information associated with the beam measurements) to the base station, and selection of a beam for sending PUCCH data in the uplink (e.g., from the UE to the base station). For example, the UE may need to report beam related information indicating whether a particular beam is blocked, indicating that a particular (e.g., strongest) beam should be used for a future transmission (e.g., a future PDSCH transmission), and/or the like.

Techniques and apparatuses described herein allow a UE to receive a downlink transmission from at least one beam of a set of beams associated with a multi-beam communication between the UE and a base station; select a beam, of the set of beams, to report beam related information associated with the at least one beam, and report an indication that the beam is a selected beam (e.g., such that that the selected beam may be used by the base station for a future downlink transmission).

Figure 9A:
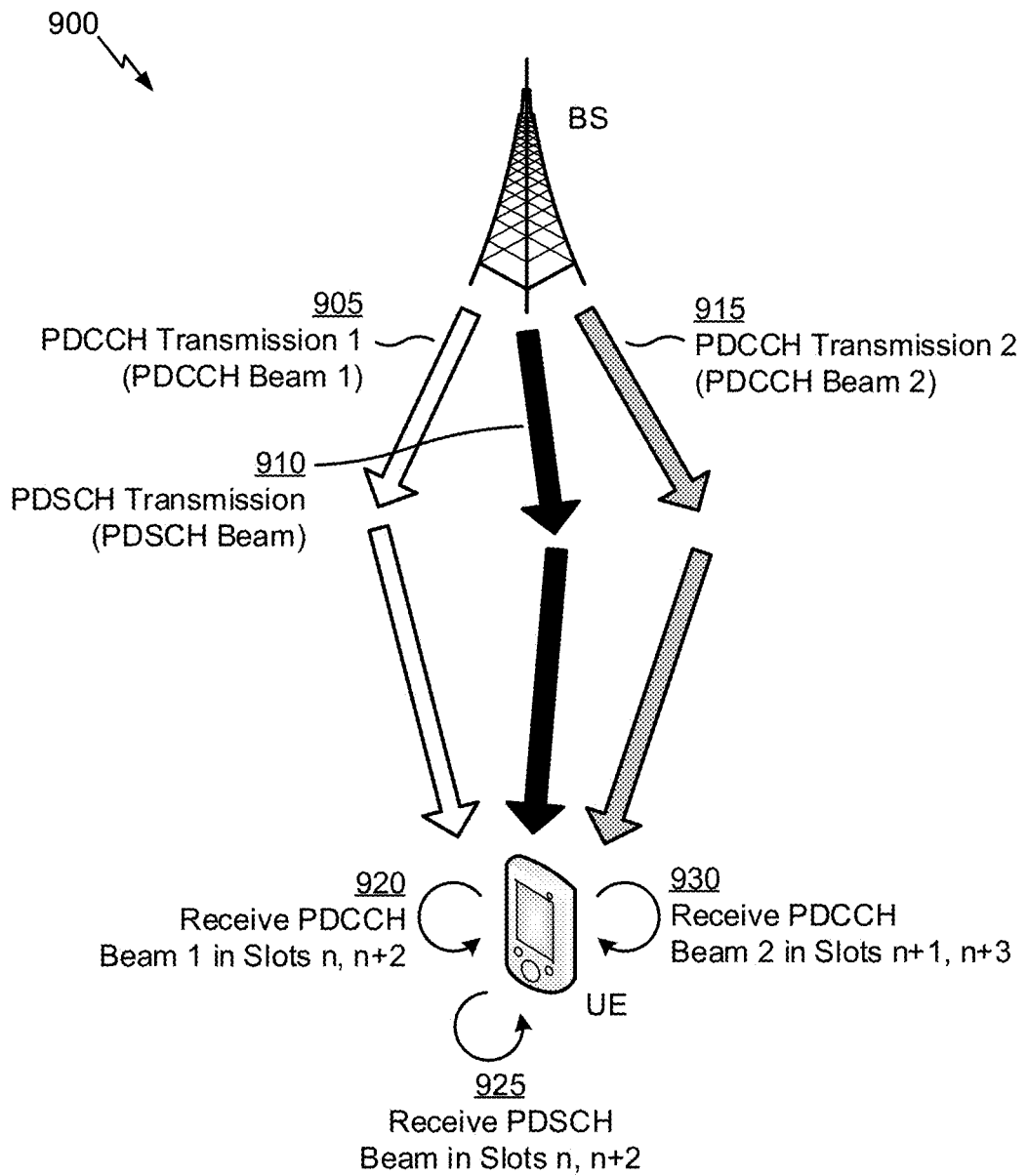
FIGS. 9A and 9B are diagrams illustrating an example of performing multi-link NR PUCCH beam selection and reporting based at least in part on PDCCH or PDSCH reference signals.
Figure 9B:
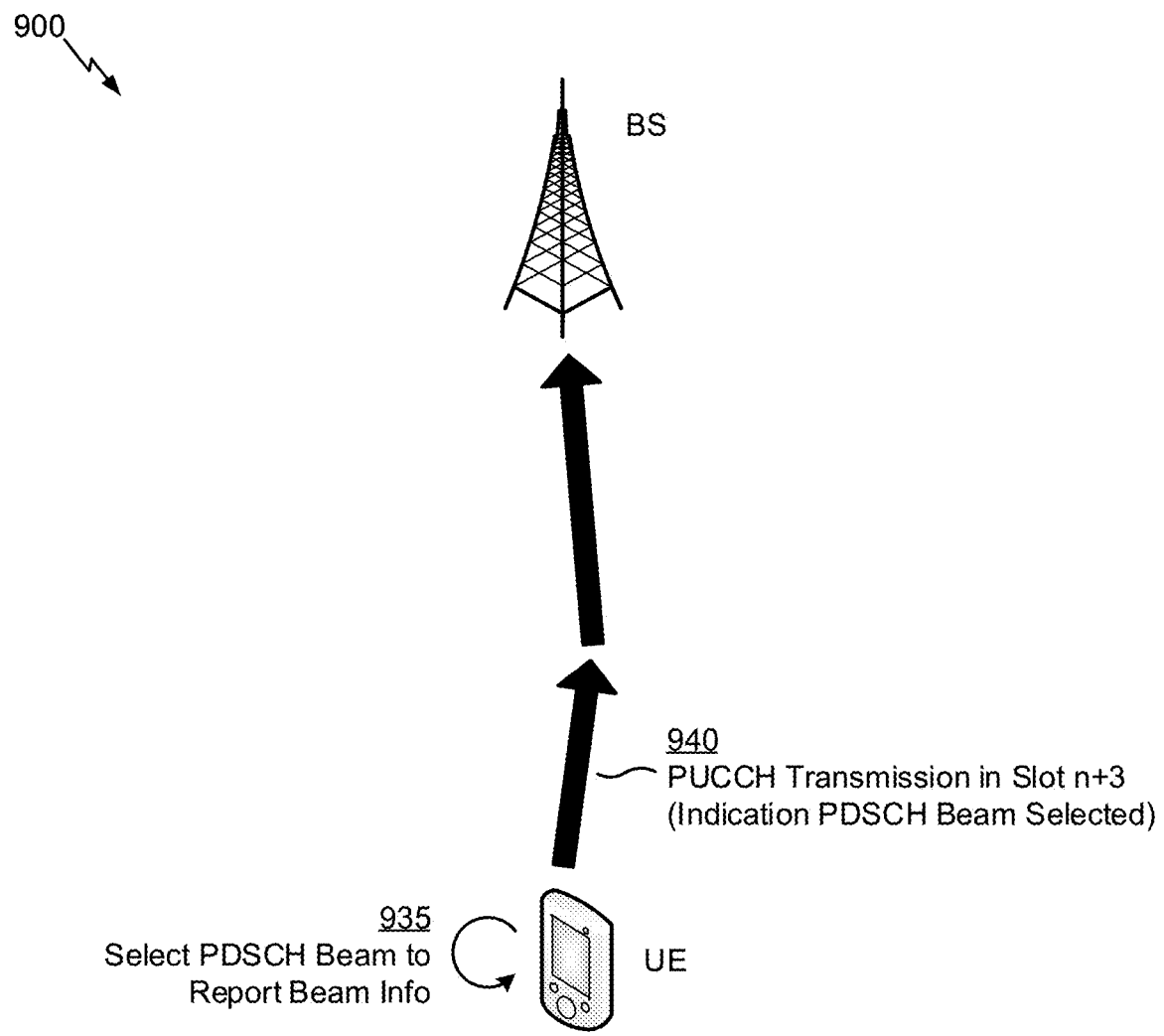

FIGS. 9A and 9B are diagrams illustrating an example 900 of performing multi-link NR PUCCH beam selection and reporting based at least in part on PDCCH or PDSCH reference signals.

As shown in FIG. 9A, and by reference numbers 905, 910, and 915, a base station (e.g., BS 110) may transmit, to a UE (e.g., UE 120) a first PDCCH transmission using a first beam (identified in FIG. 9A as PDCCH beam 1), a PDSCH transmission using a second beam (identified in FIG. 9A as PDSCH beam), and a second PDCCH transmission using a third beam (identified in FIG. 9A as PDCCH beam 2). In other words, the base station may send three transmissions to the UE using a multi-beam communication technique. In some aspects, the first PDCCH transmission, the PDSCH transmission, and/or the second PDCCH transmission may include a reference signal corresponding to the beam (e.g., an RS, a DMRS, a CRS, an SRS, or the like) and/or a reference signal that is quasi co-located with the beam (e.g., a SS that is QCL with the beam associated with the transmission, a CSI-RS that is QCL with the beam associated with the transmission, and/or the like), based at least in part on which the UE may select a particular beam to report beam related information, as described below. In an aspect where the reference signal is QCL with the beam, the UE may identify a spatial QCL relationship, associated with the QCL reference signal, based on default information stored by the UE, based on information signaled to the UE (e.g., via downlink control information (DCI), via radio resource control (RRC) messaging, via a MAC control element (MAC-CE), etc.), and/or the like.

As shown by reference number 920, the UE may receive the first PDCCH transmission, associated with the first beam, in a first set of slots (e.g., slot n and slot n+2, as shown in FIG. 9A). As shown by reference number 925, the UE may receive the PDSCH transmission, associated with the second beam, in the first set of slots (i.e., the first PDCCH transmission and the PDSCH information may be received in the same set of slots). As shown by reference number 930, the UE may receive the second PDCCH transmission, associated with the third beam, in a second set of slots (e.g., slot n+1 and slot n+3, as shown in FIG. 9A).

Notably, while FIG. 9A shows a set of three beams (e.g., each associated with one of the first PDCCH transmission, the PDSCH transmission, or the second PDCCH transmission), in some aspects, the set of beams may include a different total number of beams and/or differently associated beams (e.g., a different number of beams associated with a different number of PDCCH transmissions, a different number of beams associated with a different number of PDSCH transmissions, and/or the like).

In some aspects, the UE may select a particular beam, of the set of beams associated with the transmissions from the base station, to report beam related information associated with the set of beams. For example, as shown in FIG. 9B by reference number 935, the UE may select the second beam, associated with the PDSCH transmission, to report beam related information associated with the set of beams (e.g., the first beam, the second beam, and the third beam).

In some aspects, the selection of the beam by the UE may indicate that the selected beam is a preferred beam for a future downlink transmission (e.g., a future PDCCH transmission, a future PDSCH transmission, and/or the like). For example, the selection of the beam may indicate that the beam is a preferred beam (e.g., a strongest beam, a most powerful beam, a beam with lowest interference, and/or the like), of the set of beams, for receiving a future downlink transmission.

In some aspects, the UE may select the beam based at least in part on a set of reference signals corresponding to the set of beams. For example, as described above, the first PDCCH transmission, the PDSCH transmission, and/or the second PDCCH transmission may each include one or more reference signals (e.g., an RS, a DMRS, a CRS, an SRS, a SS that is QCL with the beam, a CSI-RS that is QCL with the beam, and/or the like). Here, the UE may determine, based at least in part on one or more reference signals associated with a given beam, a metric associated with the given beam (e.g., a beam strength, a beam power, an amount of interference, and/or the like). In some aspects, the UE may determine such information for each beam of the set of beams, and may select a beam based at least in part on the metric associated with each beam. For example, the UE may select a beam with a best metric (e.g., a highest beam strength, a lowest amount of interference, and/or the like), a beam with a metric that satisfies a threshold (e.g., a beam with a strength is equal to or greater than a threshold value, a beam with an amount of interference that is less than or equal to a threshold value), and/or the like. In some aspects, the UE may select multiple beams for reporting the beam related information (e.g., when metrics associated with two or more beams satisfy a threshold).

In some aspects, the UE may determine a metric, associated with a beam, based at least in part on information received in one or more slots (e.g., one or more reference signals received in one or more slots). For example, as described above with regard to FIG. 9A, the UE receives the first PDCCH transmission and the PDSCH transmission in slots n and n+2, and receives the second PDCCH transmission in slots n+1 and n+3. Here, the UE may determine the metric associated with the first beam and the second beam based at least in part on corresponding reference signals received in slot n+2 (i.e., the previous slot). Alternatively, the UE may determine the metric associated with the first beam and the second beam based at least in part on corresponding reference signals received in slot n and slot n+2. Here, the UE may determine the metric based at least in part on an average (e.g., a weighted average) of metrics associated with slot n and slot n+2. As another example, the UE may determine the metric associated with the third beam based at least in part on one or more reference signals received in slot n+3 (i.e., the current slot). In some aspects, the UE may determine the metric based at least in part on information received in a different number of slots than the number of slots described in the above examples. For example, in some aspects, the UE may determine the metric based at least in part on information received in three or more slots.

In some aspects, the manner in which the UE determines the metric (i.e., information for identifying the one or more slots to use for determination of the metric) may be based at least in part on a configuration provided by the base station. In some aspects, the manner in which the UE determines the metric may be based at least in part on a radio resource control message from the base station. Additionally, or alternatively, the manner in which the UE determines the metric may be based at least in part on a capability of the UE. Additionally, or alternatively, the manner in which the UE determines the metric may be based at least in part on whether a grant is an uplink grant or a downlink grant.

In some aspects, the UE may report an indication that the particular beam is a selected beam. For example, as shown in FIG. 9B by reference number 940, the UE may report (e.g., in a PUCCH transmission) that the second beam (e.g., the beam associated with the PDSCH transmission) is a selected beam.

In some aspects, the UE may report the indication that the beam is the selected beam in an uplink transmission. For example, as shown in FIG. 9B, the UE may report the indication in a PUCCH transmission in slot n+3.

In some aspects, the UE may report the indication using an uplink resource (e.g., one or more symbols in slot n+3) of a set of uplink resources, where each uplink resource in the set of uplink resources is mapped to a different beam of the set of beams, and where the uplink resource is associated with the beam. For example, with regard to example 900, a set of uplink resources may include a first uplink resource mapped to the first beam, a second uplink resource mapped to the second beam, and a third uplink resource mapped to the third beam. Here, as described above, the UE may select the second beam, and may report the indication that the second beam is the selected beam by transmitting the beam related information, associated with the set of beams, using the second uplink resource. The base station may receive the transmission that uses the second uplink resource, and determine, based at least in part on the beam related information being received in the second uplink resource, that the second beam is the selected beam (e.g., since the second uplink resource is mapped to the second beam, thereby implicitly identifying the second beam). In some aspects, the UE may identify the uplink resource mapped to the beam (i.e., the uplink resource to use for the uplink transmission) based at least in part on information provided by the base station.

In some aspects, the set of uplink resources may be time division multiplexed resources or may be a same resource (e.g., in frequency and time) that is associated with a group of different ports.

Additionally, or alternatively, the UE may report the indication using an arbitrary uplink resource (e.g., the first uplink resource, the second uplink resource, the third uplink resource, and/or the like) in an uplink transmission. For example, the UE may use one or more uplink resources (e.g., in a payload of a PUCCH transmission) to transmit an identifier associated with the selected beam (e.g., rather than using an uplink resource mapped to the selected beam). Here, the base station may receive the uplink transmission, and determine, based at least in part on the beam identifier included in the arbitrary uplink resource, that the second beam is the selected beam (e.g., since the second beam is explicitly identified). In this example, the beam related information may be included in one or more other uplink resources associated with the uplink transmission.

As indicated above, FIGS. 9A and 9B are provided as examples. Other examples are possible and may differ from what was described with respect to FIGS. 9A and 9B.

Figure 10:
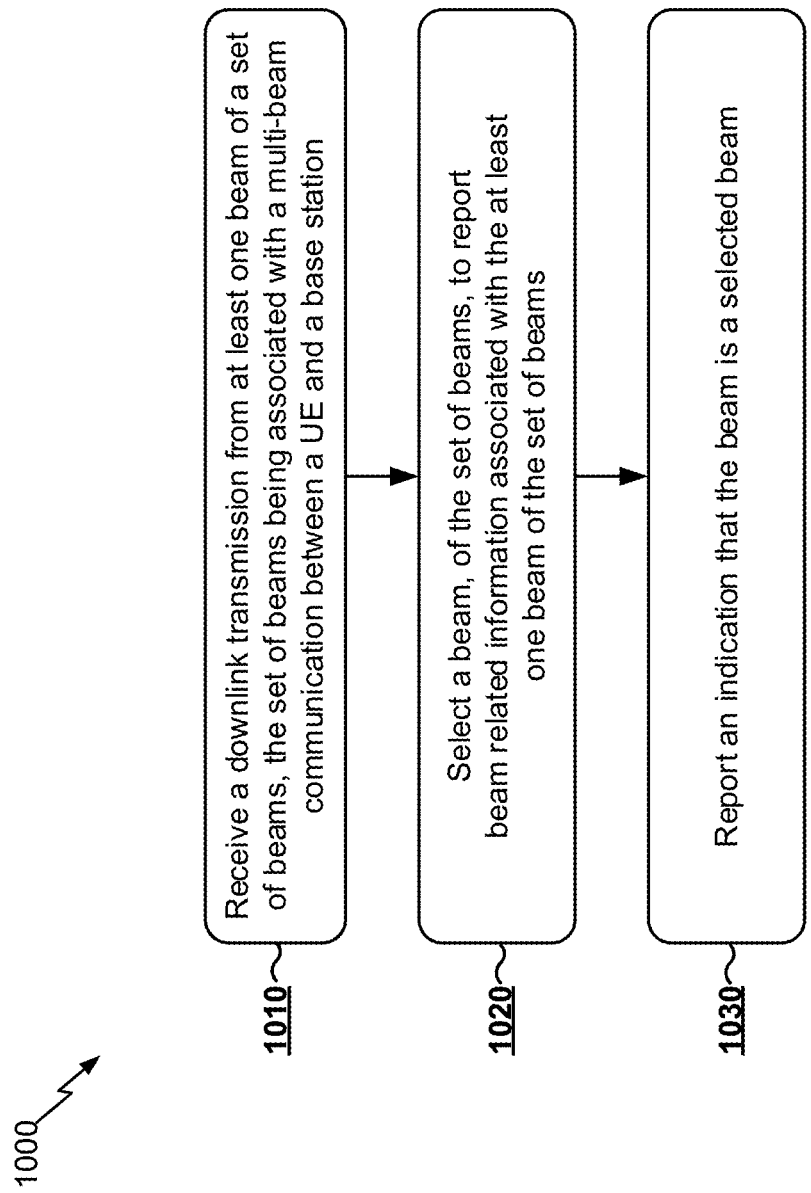
FIG. 10 is a flow chart of a method of wireless communication.

FIG. 10 is a flow chart of a method 1000 of wireless communication. The method may be performed by a user equipment (e.g., the UE 120 of FIG. 1, the apparatus 1102/1102', and/or the like).

At 1010, the UE may receive a downlink transmission from at least one beam of a set of beams, the set of beams being associated with a multi-beam communication between the UE and a base station. For example, the UE may receive a downlink transmission from at least one beam, of a set of beams transmitted by the base station, where the set of beams is associated with a multi-beam communication between the UE and a base station, as described above with regard to example 900.

In some aspects, the set of beams may include at least one of a beam associated with a PDCCH transmission or a beam associated with a PDSCH transmission, or any combination thereof.

At 1020, the UE may select a beam, of the set of beams, to report beam related information associated with the at least one beam of the set of beams. For example, the UE may select the beam, of the set of beams associated with the transmissions from the base station, to report beam related information associated with the at least one beam, as described above with regard to example 900.

In some aspects, the beam may be selected based at least in part on a reference signal corresponding to the beam or a reference signal that is QCL with the beam.

In some aspects, the beam is selected based at least in part on a metric associated with the beam, wherein the metric is determined based at least in part on a configuration provided by the base station.

At 1030, the UE may report an indication that the beam is a selected beam. For example, the UE may report an indication that the beam is a selected beam, as described above with regard to example 900.

In some aspects, the indication that the beam is the selected beam may be reported in a transmission that uses an uplink resource of a set of uplink resources, wherein each uplink resource in the set of uplink resources may be mapped to a different beam of the set of beams, and wherein the uplink resource may be associated with the beam. In some aspects, the set of uplink resources may be time division multiplexed resources or may be a same frequency and time resource associated with a group of ports. In some aspects, identification information identifying the set of uplink resources is received from the base station.

In some aspects, the indication that the beam is the selected beam includes an identifier that identifies the beam.

In some aspects, reporting may include transmitting the indication that the beam is the selected beam in a payload of a physical uplink control channel transmission.

In some aspects, reporting may include transmitting the indication that the beam is the selected beam in one or more first slots based at least in part on one or more measurements associated with one or more second slots. In some aspects, at least one of the one or more second slots may occur before the one or more first slots. In some aspects, the UE may receive information for identifying the one or more second slots in a radio resource control message from the base station. In some aspects, the information for identifying the one or more second slots may be based at least in part on a capability of the UE. In some aspects, the information for identifying the one or more second slots may be based at least in part on whether a grant is an uplink grant or a downlink grant. In some aspects, the one or more second slots may include a slot associated with a PDCCH transmission that uses a first beam of the set of beams, or a slot associated with a PDSCH transmission that uses a second beam of the set of beams.

In some aspects, a method of wireless communication may include transmitting, by a base station, downlink data to a user equipment using a set of beams associated with a multi-beam communication between the base station and the UE; receiving, by the base station, uplink data including an indication that at least one beam, of the set of beams, is a selected beam to communicate beam related information; and identifying, by the base station, the at least one beam as the selected beam based at least in part on the uplink data.

Although FIG. 10 shows example blocks of a method of wireless communication, in some aspects, the method may include additional blocks, fewer blocks, different blocks, or differently arranged blocks than those shown in FIG. 10. Additionally, or alternatively, two or more blocks shown in FIG. 10 may be performed in parallel.

Figure 11:
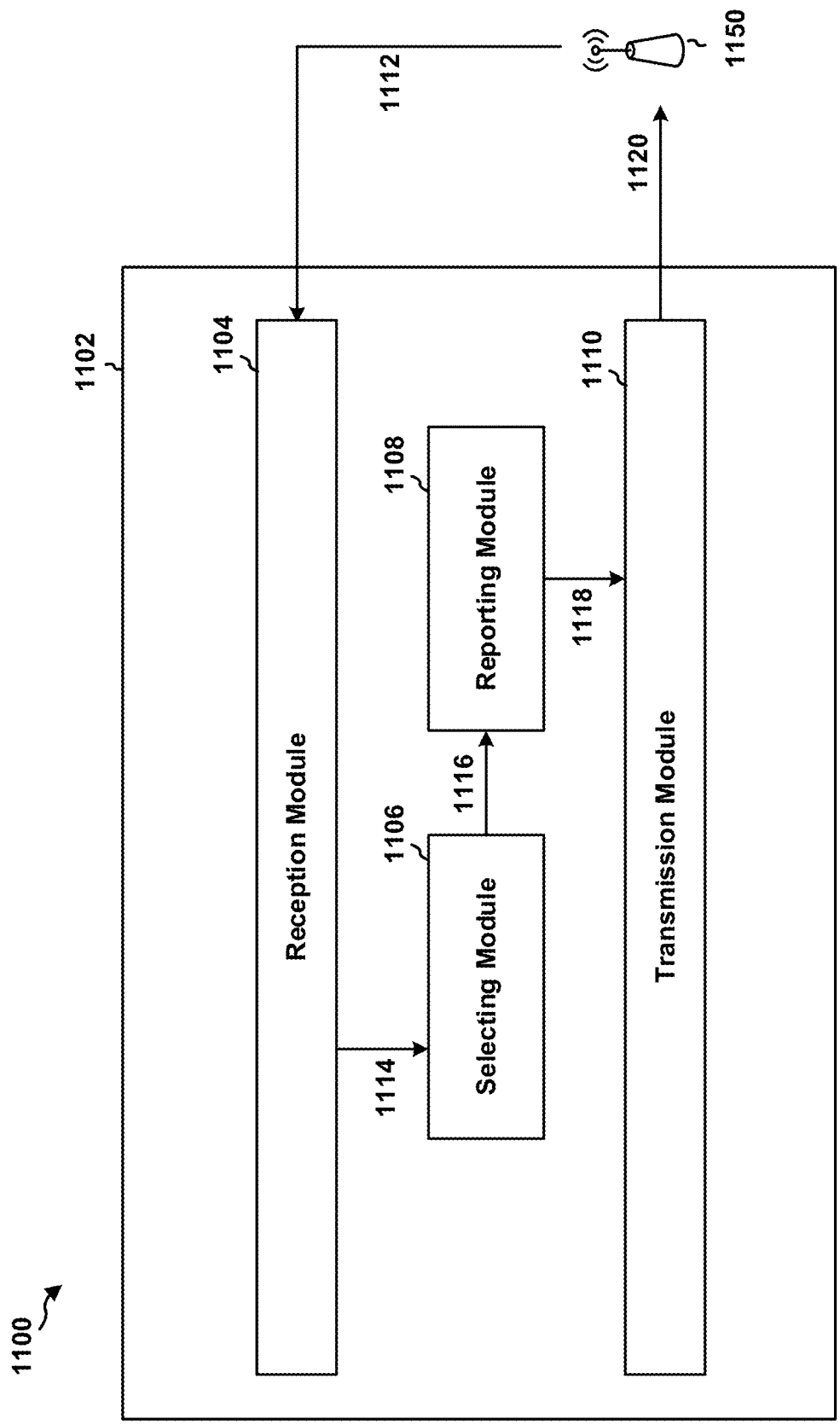
FIG. 11 is a conceptual data flow diagram illustrating the data flow between different modules/means/components in an example apparatus.

FIG. 11 is a conceptual data flow diagram 1100 illustrating the data flow between different modules/means/components in an example apparatus 1102. The apparatus 1102 may be a UE. In some aspects, the apparatus 1102 includes a reception module 1104, a selecting module 1106, a reporting module 1108, and/or a transmission module 1110.

The reception module 1104 may receive data 1112 from a base station 1150, such as data associated with a set of downlink transmissions transmitted by the base station 1150 using a set of beams. In some aspects, the reception module 1104 may provide data 1114 to the selecting module 1106. In some aspects, the data 1114 may indicate that the selecting module 1106 is to select a beam, of the set of beams, to report beam related information associated with the set of beams. The selecting module 1106 may select a beam to report the beam related information, as described above.

The selecting module 1106 may provide data 1116 to the reporting module 1108. In some aspects, the data 116 may indicate that the reporting module 1108 is to report an indication that the beam is a selected beam. The reporting module 1108 may report the indication that the beam is a selected beam, as described above.

The reporting module 1108 may provide data 1118 to the transmission module 1110. For example, the reporting module 1108 may provide data 1118, including the indication that the beam is a selected beam, to transmission module 1110. The transmission module 1110 may transmit data 1120, including the indication, to base station 1150.

The apparatus may include additional modules that perform each of the blocks of the algorithm in the aforementioned flow chart of FIG. 10. As such, each block in the aforementioned flow chart of FIG. 10 may be performed by a module and the apparatus may include one or more of those modules. The modules may be one or more hardware components specifically configured to carry out the stated processes/algorithm, implemented by a processor configured to perform the stated processes/algorithm, stored within a computer-readable medium for implementation by a processor, or some combination thereof.

The number and arrangement of modules shown in FIG. 11 are provided as an example. In practice, there may be additional modules, fewer modules, different modules, or differently arranged modules than those shown in FIG. 11. Furthermore, two or more modules shown in FIG. 11 may be implemented within a single module, or a single module shown in FIG. 11 may be implemented as multiple, distributed modules. Additionally, or alternatively, a set of modules (e.g., one or more modules) shown in FIG. 11 may perform one or more functions described as being performed by another set of modules shown in FIG. 11.

Figure 12:
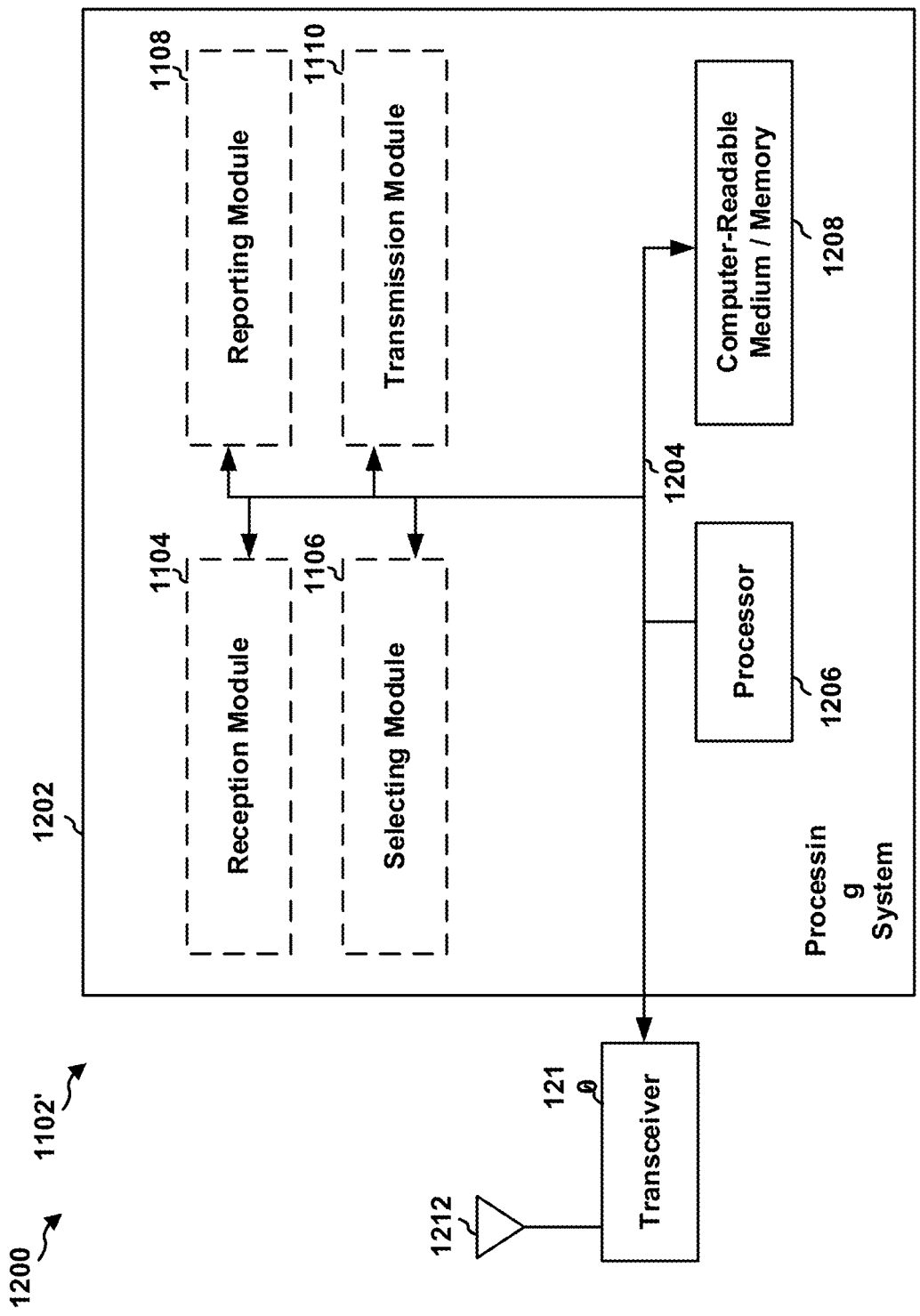
FIG. 12 is a diagram illustrating an example of a hardware implementation for an apparatus employing a processing system.

FIG. 12 is a diagram 1200 illustrating an example of a hardware implementation for an apparatus 1102' employing a processing system 1202. The apparatus 1102' may be a UE.

The processing system 1202 may be implemented with a bus architecture, represented generally by the bus 1204. The bus 1204 may include any number of interconnecting buses and bridges depending on the specific application of the processing system 1202 and the overall design constraints. The bus 1204 links together various circuits including one or more processors and/or hardware modules, represented by the processor 1206, the modules 1104, 1106, 1108, 1110, and the computer-readable medium/memory 1208. The bus 1204 may also link various other circuits such as timing sources, peripherals, voltage regulators, and power management circuits, which are well known in the art, and therefore, will not be described any further.

The processing system 1202 may be coupled to a transceiver 1210. The transceiver 1210 is coupled to one or more antennas 1212. The transceiver 1210 provides a means for communicating with various other apparatus over a transmission medium. The transceiver 1210 receives a signal from the one or more antennas 1212, extracts information from the received signal, and provides the extracted information to the processing system 1202, specifically the reception module 1104. In addition, the transceiver 1210 receives information from the processing system 1202, specifically the transmission module 1110, and based at least in part on the received information, generates a signal to be applied to the one or more antennas 1212. The processing system 1202 includes a processor 1206 coupled to a computer-readable medium/memory 1208. The processor 1206 is responsible for general processing, including the execution of software stored on the computer-readable medium/memory 1208. The software, when executed by the processor 1206, causes the processing system 1202 to perform the various functions described supra for any particular apparatus. The computer-readable medium/memory 1208 may also be used for storing data that is manipulated by the processor 1206 when executing software. The processing system further includes at least one of the modules 1104, 1106, 1108, and 1110. The modules may be software modules running in the processor 1206, resident/stored in the computer-readable medium/memory 1208, one or more hardware modules coupled to the processor 1206, or some combination thereof. The processing system 1202 may be a component of the UE 120 and may include the memory 282 and/or at least one of the TX MIMO processor 266, the RX processor 258, and/or the controller/processor 280.

In some aspects, the apparatus 1102/1102' for wireless communication includes means for receiving a downlink transmission from at least one beam of a set of beams, the set of beams being associated with a multi-beam communication between the apparatus 1102/1102' and a base station; means for selecting a beam, of the set of beams, to report beam related information associated with the at least one beam of the set of beams; and means for reporting an indication that the beam is a selected beam. The aforementioned means may be one or more of the aforementioned modules of the apparatus 1102 and/or the processing system 1202 of the apparatus 1102' configured to perform the functions recited by the aforementioned means. As described supra, the processing system 1202 may include the TX MIMO processor 266, the RX processor 258, and/or the controller/processor 280. As such, in one configuration, the aforementioned means may be the TX MIMO processor 266, the RX processor 258, and/or the controller/processor 280 configured to perform the functions recited by the aforementioned means.

FIG. 12 is provided as an example. Other examples are possible and may differ from what was described in connection with FIG. 12.

It is understood that the specific order or hierarchy of blocks in the processes/flow charts disclosed is an illustration of example approaches. Based upon design preferences, it is understood that the specific order or hierarchy of blocks in the processes/flow charts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "at least one of A, B, and C," and "A, B, C, or any combination thereof" include any combination of A, B, and/or C, and may include multiples of A, multiples of B, or multiples of C. Specifically, combinations such as "at least one of A, B, or C," "at least one of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for."

What is claimed is:

1. A method of wireless communication, comprising:
   receiving, by a user equipment (UE), downlink transmission of a plurality of beams, the plurality of beams being associated with a multi-beam communication between the UE and a base station;
   determining, by the UE, a metric for each of the plurality of beams, the metric for each of the plurality of beams being based on beam measurement during at least a first slot and a second slot;
   at the UE, performing beam selection among the plurality of beams based at least in part on the metric associated with each beam, the beam selection to report beam related information associated with at least one beam of the plurality of beams; and
   reporting, by the UE, the beam related information.

2. The method of claim 1, wherein the beam measurement is based on one or more reference signals received in the first slot and the second slot.

3. The method of claim 1, wherein the beam measurement is based on one or more of a physical downlink control channel (PDCCH) transmission or a physical downlink shared channel (PDSCH) transmission received in one or more of the first slot or the second slot.

4. The method of claim 1, wherein the plurality of beams include a first beam, a second beam, and a third beam.

5. The method of claim 1, wherein the metric is determined further based on information associated with a third slot.

6. The method of claim 1, wherein the metric is determined further based on a configuration provided by the base station.

7. The method of claim 6, wherein at least one slot, of the first slot and the second slot, is identified based at least in part on the configuration provided by the base station.

8. The method of claim 1, wherein the metric is determined further based on a radio resource control message from the base station.

9. The method of claim 1, wherein the metric is determined further based on a capability of the UE.

10. The method of claim 1, wherein the metric is determined further based on whether a grant is an uplink grant or a downlink grant.

11. The method of claim 1, wherein the beam related information is reported in a physical uplink control channel (PUCCH) transmission.

12. A user equipment (UE) for wireless communication, comprising:
   a memory; and
   one or more processors operatively coupled to the memory, the memory and the one or more processors configured to:
   receive downlink transmission of a plurality of beams, the plurality of beams being associated with a multi-beam communication between the UE and a base station;
   determine a metric for each of the plurality of beams, the metric for each of the plurality of beams being based on beam measurement during at least a first slot and a second slot;
   perform beam selection among the plurality of beams based at least in part on the metric associated with each beam, the beam selection to report beam related information associated with at least one beam of the plurality of beams; and
   report the beam related information.

13. The UE of claim 12, wherein the metric is determined further based on a configuration provided by the base station.

14. The UE of claim 13, wherein at least one slot, of the first slot and the second slot, is identified based at least in part on the configuration provided by the base station.

15. A non-transitory computer-readable medium storing one or more instructions for wireless communication, the one or more instructions comprising:
   one or more instructions that, when executed by one or more processors of a UE, cause the one or more processors to:
   receive downlink transmission of a plurality of beams, the plurality of beams being associated with a multi-beam communication between the UE and a base station;
   determine a metric for each of the plurality of beams, the metric for each of the plurality of beams being based on beam measurement during at least a first slot and a second slot;
   perform beam selection among the plurality of beams based at least in part on the metric associated with each beam, the beam selection to report beam related information associated with at least one beam of the plurality of beams; and
   report the beam related information.

16. The non-transitory computer-readable medium of claim 15, wherein the metric is determined further based on a configuration provided by the base station.

17. The non-transitory computer-readable medium of claim 16, wherein at least one slot, of the first slot and the second slot, is identified based at least in part on the configuration provided by the base station.

18. An apparatus for wireless communication, comprising:
   means for receiving downlink transmission of a plurality of beams, the plurality of beams being associated with a multi-beam communication between the apparatus and a base station;
   means for determining a metric for each of the plurality of beams, the metric for each of the plurality of beams being based on beam measurement during at least a first slot and a second slot;
   means for performing beam selection among the plurality of beams based at least in part on the metric associated with each beam, the beam selection to report beam related information associated with at least one beam of the plurality of beams; and
   means for reporting the beam related information.

19. The apparatus of claim 18, wherein the metric is determined further based on a configuration provided by the base station.

20. The apparatus of claim 19, wherein at least one slot, of the one or more slots, is identified based at least in part on the configuration provided by the base station.

* * * * *